United States Patent
Maeda et al.

(10) Patent No.: US 8,725,954 B2
(45) Date of Patent: May 13, 2014

(54) INFORMATION PROCESSING APPARATUS AND MEMORY CONTROL APPARATUS

(75) Inventors: Koichi Maeda, Kawasaki (JP); Hiroyuki Wada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 195 days.

(21) Appl. No.: 13/101,362

(22) Filed: May 5, 2011

(65) Prior Publication Data

US 2011/0213933 A1 Sep. 1, 2011

Related U.S. Application Data

(63) Continuation of application No. PCT/JP2008/070437, filed on Nov. 10, 2008.

(51) Int. Cl.
*G06F 12/00* (2006.01)

(52) U.S. Cl.
USPC .................... 711/143; 711/141; 711/210

(58) Field of Classification Search
None
See application file for complete search history.

(56) References Cited

U.S. PATENT DOCUMENTS

| | | | |
|---|---|---|---|
| 6,055,610 A | 4/2000 | Smith et al. | |
| 6,560,681 B1 | 5/2003 | Wilson et al. | |
| 7,099,913 B1* | 8/2006 | Bertone et al. | 709/202 |
| 7,373,466 B1 | 5/2008 | Conway | |
| 7,925,839 B1* | 4/2011 | Miller et al. | 711/141 |
| 2003/0079086 A1 | 4/2003 | Shanahan et al. | |
| 2004/0019751 A1 | 1/2004 | Sharma et al. | |
| 2008/0104331 A1* | 5/2008 | Handgen | 711/141 |
| 2008/0183967 A1 | 7/2008 | Speier et al. | |
| 2010/0325367 A1* | 12/2010 | Kornegay et al. | 711/143 |

FOREIGN PATENT DOCUMENTS

| | | |
|---|---|---|
| JP | 05-100952 | 4/1993 |
| JP | 11-154115 | 6/1999 |
| JP | 2000-067024 | 3/2000 |
| JP | 2003-186742 | 7/2003 |
| JP | 2004-054931 | 2/2004 |
| JP | 2006-501546 | 1/2006 |
| WO | WO 2004/029776 | 4/2004 |

OTHER PUBLICATIONS

Manuel E. Acacio et al, "Reducing the Latency of L2 Misses in Shared-Memory Multiprocessors through On-Chip Directory Integration", Proceedings of the 10$^{th}$ Euromicro Workshop on Parallel, Distributed and Network-based Processing (Euromicro—PDP'02), Jan. 9, 2002, pp. 368-375.

(Continued)

*Primary Examiner* — Matthew Bradley
*Assistant Examiner* — Candice Rankin
(74) *Attorney, Agent, or Firm* — Staas & Halsey LLP

(57) ABSTRACT

A memory control apparatus, in a case of receiving from a processor, under a condition where the number of cache memories retaining a copy of data stored in a main storage device is one, a notification to the effect that data retained in the cache memory is purged, updates directory information on a directory cache without accessing the main storage device when the data is not modified by the processor, and the directory information on the directory cache and directory information on the main storage device is determined to be different and the directory information on the main storage device is determined to be in a state indicating that the copy of the data is not retained by any processor in the state of coherence.

11 Claims, 6 Drawing Sheets

(56) References Cited

OTHER PUBLICATIONS

International Search Report for PCT/JP2008/070437, Mailed Jul. 22, 2009.

International Search Report, mailed Jul. 21, 2009, in corresponding International Application No. PCT/JP2008/070437 (5 pp).

Extended European Search Report dated Jun. 6, 2012 issued in corresponding European Patent Application No. EP08877994.7.

* cited by examiner

INFORMATION PROCESSING APPARATUS AND MEMORY CONTROL APPARATUS

CROSS-REFERENCE TO RELATED APPLICATION

This application is a continuation of PCT international application Ser. No. PCT/JP2008/070437 filed on Nov. 10, 2008 which designates the United States, incorporated herein by reference.

FIELD

The embodiment discussed herein is directed to an information processing apparatus and a memory control apparatus.

BACKGROUND

Conventionally, a multiprocessor system which is an information processing apparatus that executes a plurality of tasks in parallel by using a plurality of processors has been used widely as a technique for improving a performance of a computer and executing various tasks.

In the multiprocessor system, there is a case in which data updated by a certain processor remains in a cache memory and the latest data is not present in a main storage device. When another processor tries to refer to or update the data in this case, there is a possibility that a coherence of data (data coherence) cannot be maintained and a correct result cannot be obtained. To prevent the circumstance, a memory access control by using directory information is performed in the multiprocessor system, for example.

Specifically, data stored in each cache memory and the main storage device is associated with directory information which indicates a state of the data (whether or not the data is updated, for example). Then, a memory controller as a memory control apparatus that controls a data transfer between the cache memory and the main storage device determines whether the latest data is present on the main storage device or on any cache memory of other processors with reference to the directory information. By this, each processor can access the latest data at any time and the data coherence can be maintained.

Moreover, another multiprocessor system provided with a directory cache that manages directory information of data stored in a main storage device separately from the main storage device has been developed in recent years. In the multiprocessor system, a memory controller becomes free from a necessity of accessing the main storage device point by point for checking a state of the data stored in the main storage device and the number of accesses to the main storage device is reduced, so that a hi-speed data process can be achieved.

However, there has been a case of causing an unnecessary access to the main storage device and thereby causing a burden on a memory band in the conventional memory access controlling method. The memory access controlling method in the conventional multiprocessor system will be explained below specifically.

In the conventional multiprocessor system, data (cached copy) retained in each cache memory may be expressed by states of "MESI" in which a capital letter "M" is an abbreviation for "Modify", "E" for "Exclusive", "S" for "Share", and "I" for "Invalid", for example. In addition, the directory information of the main storage device and the directory cache may include information which indicates three states of "E", "S", and "I" and information which identifies a processor retaining a copy of data stored in the main storage device.

Besides, an entry of the directory cache may be defined by three states, "N" as an abbreviation for "Null", "C" for "Clean", and "D" for "Dirty", for example. Here, the abbreviation "N" indicates that no valid information is present on the directory cache and directory information can be written into an entry defined by this state. The abbreviation "C" indicates that the directory information on the directory cache is the same as that on the main storage device and an entry defined by this state can be purged without rewriting the directory information of the main storage device. The abbreviation "D" indicates that the directory information on the directory cache is different from that on the main storage device and the directory information of the main storage device needs to be rewritten by the information of the directory cache in purging an entry in this state.

Each entry of the directory cache transits from one state to another among the states "N", "C", and "D" depending on a kind of accesses processed by the memory controller. Specifically, the memory controller changes a state of an entry from "N" to "D" for example in a case of receiving a "Request To Share" (RTS) or a "Request To Own" (RTO) with respect to data which is not retained in a cache memory of any processor (step S01) as illustrated in FIG. 6. The memory controller changes the state of the entry to "N" in a case of receiving a notification "Eviction" of a cache line corresponding to the entry from a processor or in a case where the entry is purged from the directory cache due to an insufficiency in capacity and the like when the state of the entry is "D" (step S02).

In a case of receiving the "RTS" with respect to a cache line retained in the state "M" by (a cache memory used by) any processor when the state of the entry is "D", the memory controller changes the state of the entry from "D" to "C" (step S03). In a case of receiving the "RTO" or in a case of receiving the "RTS" with respect to a cache line which is not retained in the state "M" when the state of the entry is "C", the memory controller changes the state of the entry from "C" to "D" (step S04).

In a case of receiving the notification "Eviction" of a cache line from a processor or in a case where the entry is purged (cleaned out) from the directory cache when the state of the entry is "C", the memory controller changes the state of the entry from "C" to "N" (step S05 or step S06). Here, an arrow drawn in a heavy line in FIG. 6 indicates an occurrence of an access to the main storage device when the memory controller performs a corresponding process (among processes at steps S02, S03, and S05).

The memory controller then determines whether or not to access the main storage device based on the state of the entry in receiving a request of various kinds from a processor.

Here, a case in which an unnecessary access to the main storage device by the memory controller occurs will be explained specifically with reference to FIG. 7. FIG. 7 is an explanatory view of a memory access controlling method in the conventional multiprocessor system. Here, data (Payload) "aaaaaa" stored at an address X of the main storage device at an initial state is assumed not to be stored in any cache memory and to be retained in the main storage device in the state "I". The multiprocessor system adopts a directory cache of a write-back system. The write-back system is a system of writing, without writing data in parallel to both of a cache memory and a main storage device in writing the data to the cache memory, the data to the main storage device in the case where the data is purged from the cache memory and the like.

As illustrated in FIG. 7, in a case where a processor A transmits the "RTS" to a memory controller for sharing the data "aaaaaa" stored in the main storage device (step S11), the memory controller requests "Read" with respect to the main storage device (step S12) to obtain the data "aaaaaa" (step S13). The memory controller then transmits the obtained data "aaaaaa" to the processor A (step S14) and the processor A having obtained the data updates directory information of its own cache memory to be "S". Since directory information of the main storage device is not rewritten at this time point in the multiprocessor system adopting the write-back system, the data "aaaaaa" of the main storage device remains in the state "I".

On this occasion, the memory controller records "S:Sharer=A" as information of the state of the data "aaaaaa" and a processor which retains the data, and records "address X" as address information at the same time in the directory information of the directory cache. The memory controller then makes a state of an entry corresponding to the data "aaaaaa" "D" since the directory information "S:Sharer=A" on the directory cache and the directory information "I:undefined" is different.

Next, in the case of purging a cache line because the cache line cannot be stored in a cache memory, becomes unnecessary, and the like, the processor A transmits a notification "Eviction" to the memory controller (step S15). The notification "Eviction" is a signal to be transmitted in purging data in the cache memory. The memory controller having received the notification "Eviction" makes the entry corresponding to the data "aaaaaa" in the directory cache null (makes the state transit to the state "N").

When the state of the entry is "D" on this occasion, the memory controller accesses (performs reading, modifying, and writing in) the main storage device (step S16) since the directory information on the main storage device needs to be written-back to be accorded with the directory information on the directory cache. Here, when the cached copy on the cache memory is not modified and when the directory information of the data "aaaaaa" stored in the main storage device is in the state "I" from the beginning, there is no change in the content (data and directory information) of the main storage device before and after the process of the notification "Eviction". In other words, the access to the main storage device in this case is unnecessary fundamentally.

However, the memory controller cannot determine the content of the directory information in the main storage device only based on the directory information on the directory cache in the conventional multiprocessor system, thereby performing a memory access despite the fundamental unnecessity.

SUMMARY

According to an aspect of an embodiment of the invention, an information processing apparatus includes a main storage device that stores data and manages a state of the stored data as directory information; cache memories that retain a copy of the data stored in the main storage device; processors that perform a process by using the data retained in the cache memories; a directory cache that manages the directory information of the data stored in the main storage device separately from the main storage device, and manages coherence state information indicating a state of coherence between the directory information managed by the directory cache and the directory information managed by the main storage device; and a memory control apparatus that controls a data transfer between the cache memories and the main storage device based on the information managed by the directory cache. When a single cache memory retains a copy of data stored in the main storage device and the memory control apparatus receives a notice that data retained in the cache memory is purged from any of the processor, the memory control apparatus updates the directory information on the directory cache and accesses the main storage device to perform a write-back of the directory information on the main storage device when the coherence state information indicates that the directory information on the directory cache and the directory information on the main storage device are different, and updates the directory information on the directory cache without accessing the main storage device when the data is not modified by the processor. The coherence state information indicates that the directory information on the directory cache and the directory information on the main storage device are different. The directory information on the main storage device indicates that the copy of the data is not retained by any of the processors.

According to another aspect of an embodiment of the invention, a memory control apparatus is provided in an information processing apparatus that includes a main storage device that stores data and manages a state of the data as directory information; a plurality of cache memories that retain a copy of the data stored in the main storage device, a plurality of processors that perform a process by using the data retained in the cache memories; and a directory cache that manages the directory information of the data stored in the main storage device separately from the main storage device and manages information indicating a state of coherence between the self-managing directory information and the directory information managed by the main storage device. The memory control apparatus includes a transfer controller that controls a data transfer between the cache memories and the main storage device based on the information managed by the directory cache; an information updater that updates the directory information on the directory cache and accesses the main storage device to perform a write-back of the directory information on the main storage device when the directory information on the directory cache and the directory information on the main storage device is determined to be different in the state of coherence, and updates the directory information on the directory cache without accessing the main storage device when the data is not modified by the processor, and the directory information on the directory cache and the directory information on the main storage device is determined to be different and the directory information on the main storage device is determined to be in a state indicating that the copy of the data is not retained by any of the processors in the state of coherence when the memory control apparatus receives a notification to an effect that the data retained in the cache memory is purged from the processor under a condition where a number of cache memories retaining the copy of the data stored in the main storage device is one.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A preferred embodiment of an information processing apparatus and a memory control apparatus according to the present invention will be explained in detail below with reference to the accompanying drawings.

Figure 1:
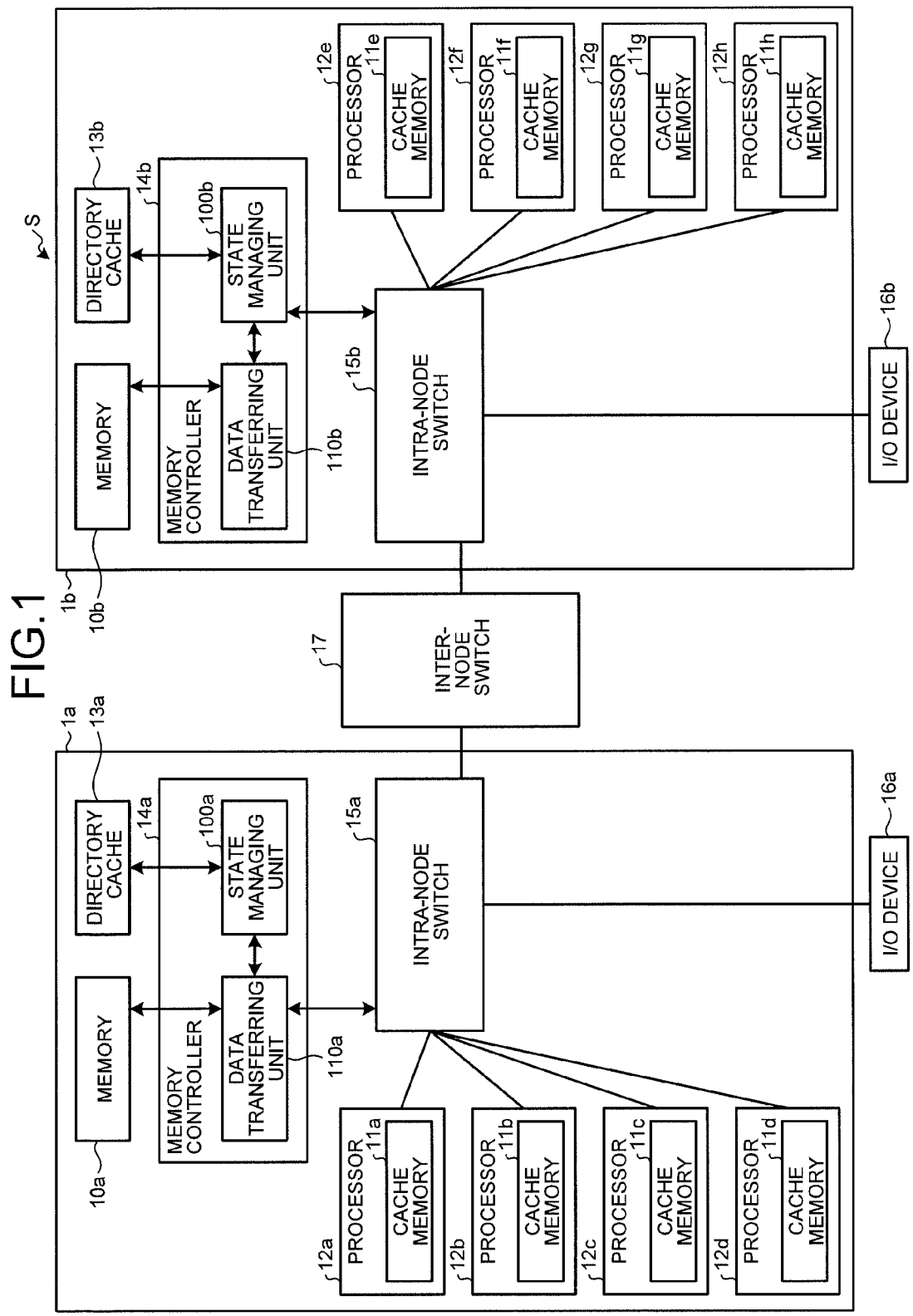
FIG. 1 illustrates an example of a configuration of a multiprocessor system according to an embodiment.

First, a configuration of a multiprocessor system according to an embodiment will be explained with reference to the drawings. FIG. 1 illustrates an example of a configuration of a multiprocessor system according to the embodiment. While the multiprocessor system according to the embodiment is configured to adopt a cache coherent non-uniform memory access (ccNUMA) system, the multiprocessor system does not necessarily adopt this system and may be configured by one system board. In the "ccNUMA" system, since a plurality of system boards each of which is provided with a processor are connected to each other and thereby a processor accesses a local memory of another system board, a cache coherence can be maintained though a memory access time from each processor is not of uniformity.

As illustrated in FIG. 1, a multiprocessor system S according to the embodiment is provided with two system boards 1a and 1b. The system board 1a includes a memory 10a, processors 12a to 12d, a directory cache 13a, a memory controller 14a, and an intra-node switch 15a. Besides, the system board 1b includes a memory 10b, processors 12e to 12h, a directory cache 13b, a memory controller 14b, and an intra-node switch 15b.

Figure 2:
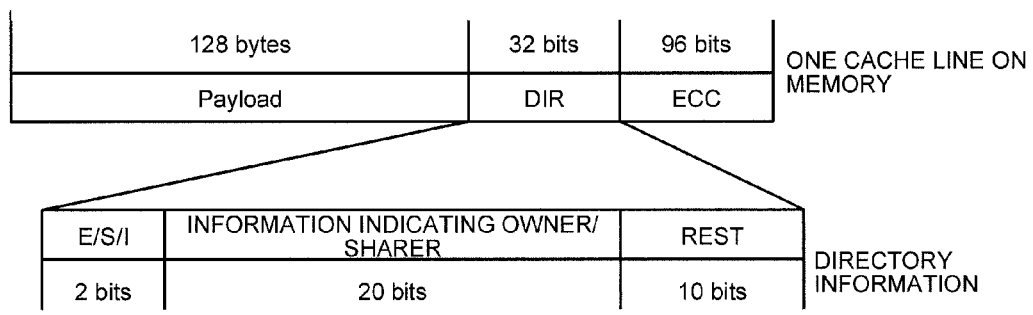
FIG. 2 is illustrates an example of a cache line on a memory and a bit structure of directory information contained in the cache line.

The memory 10, which corresponds to a main storage device, stores various data and manages a state of the data as directory information. Here, the directory information will be explained. FIG. 2 is illustrates an example of a cache line on a memory and a bit structure of directory information contained in the cache line.

As illustrated in FIG. 2, one cache line on the memory 10 includes 128 bytes for Payload, 32 bits for directory information (DIR), and 96 bits for an error correcting code (ECC). The Payload indicates data mass except for additional information like the directory information and the ECC. The ECC enables a detection of an error in data and an automatic correction thereof.

Out of 32 bits for the directory information, 2 bits are used for information which indicates a state of the data (Payload), 20 bits are used for information which indicates an owner/sharer, and the rest 10 bits are not used.

Each piece of data is expressed by three states "E" (Exclusive), "S" (Share), and "I" (Invalidate). The abbreviation "E" indicates a state in which a corresponding piece of data is retained by any one of cache memories 11 and whether the corresponding piece of data is identical to a cached copy retained by the cache memory 11 is unknown (the cached copy may be changed from the data on the memory). The abbreviation "S" indicates a state in which there exist a plurality of cache memories 11 which retain the corresponding piece of data and the corresponding data is identical to the cached copy retained by each of the cache memories 11. The abbreviation "I" indicates a state in which there exists no cache memory 11 which retains the corresponding piece of data.

The information indicating an owner/sharer allows identifying a processor 12 that retains a copy of data stored in the memory 10 and is expressed by an identification number and the like of each processor 12. When processors 12a and 12d share a certain piece of data for example, the information indicating an owner/sharer becomes "Sharer=12a, 12d".

The processors 12a to 12h include cache memories 11a to 11h, respectively. The cache memory 11 temporarily retains a copy of the data retained in the memory 10. The processor 12 then uses data retained in its own cache memory 11 to perform various processes.

Here, the cache memory 11 includes directory information which indicates a state of the cached copy. The state of the cached copy is expressed by four states including "M" (Modified) in addition to "E", "S", and "I" described above. The abbreviation "M" indicates a state in which a copy of the data stored in the memory 10 is retained only by itself and the corresponding copy (cached copy) is modified from the data on the memory 10. The abbreviation "E" indicates a state in which a copy of the data stored in the memory 10 is retained by itself and the corresponding copy is identical to the data on the memory. The abbreviation "S" indicates a state in which a copy of a certain piece of data stored in the memory 10 is retained by a plurality of processors 12 including itself and the cached copy retained by each of the processors 12 is identical to the data on the memory 10. The abbreviation "I" indicates a state in which a cached copy is not retained.

As described so far, a memory access control is performed based on the "MESI" protocol in the multiprocessor system S according to the embodiment.

Figure 3:
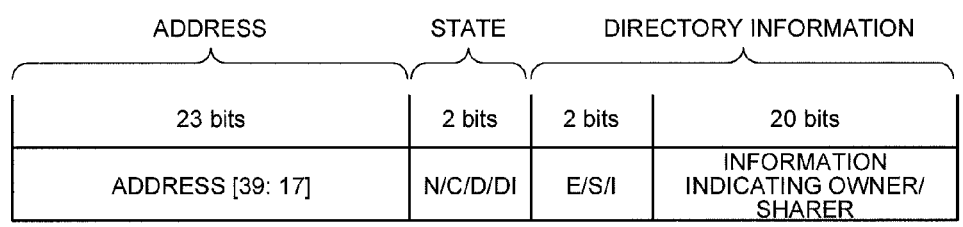
FIG. 3 illustrates an example of a bit structure of an entry of a directory cache.

The directory cache 13 manages directory information of the data stored in the memory 10 separately from the memory 10 and manages information which indicates a state of coherence between directory information managed by itself and the directory information managed by the memory 10. Here, a bit structure of an entry of the directory cache 13 will be explained. FIG. 3 illustrates an example of a bit structure of an entry of the directory cache 13.

As illustrated in FIG. 3, an entry of the directory cache 13 includes address information (address: 23 bits), information of the state of coherence between the directory information managed by itself and the directory information managed by the memory 10 (state: 2 bits), and the directory information (22 bits). The address information indicates what position on the memory 10 data managed by the corresponding entry is stored. The directory information managed by the directory cache 13 includes, similarly to the directory information managed by the memory 10, information indicating a state of a corresponding piece of data (E/S/I) and information indicating an owner/sharer.

The information indicating a state of coherence between the directory information managed by itself and the directory information managed by the memory 10 (hereinafter this information being referred to as "state") is indicated by four states "N" (Null), "C" (Clean), "D" (Dirty), and "DI" (Dirty formerly Invalid).

Specifically, the abbreviation "N" indicates that there is no valid information on the directory cache 13 and directory information can be written into an entry defined by this state. The abbreviation "C" indicates that the directory information on the directory cache 13 is identical to the directory information on the main storage device and an entry defined by this state can be discarded without rewriting the directory information of the main storage device. The abbreviation "D" indicates that the directory information on the directory cache 13 is different from the directory information on the main storage device and the directory information on the main storage device needs to be rewritten by the information of the directory cache in discarding an entry in this state.

In addition, the abbreviation "DI" indicates a state telling the directory information on the directory cache 13 is different from the directory information on the memory 10 and the directory information on the memory 10 is in the state "I".

As described so far, an unnecessary memory access which occurs in the conventional multiprocessor system is reduced by newly adding the state "DI" to the three states conventionally expressed by "N", "C", and "D" in the multiprocessor system S according to the embodiment.

In the embodiment, a memory dealt with by one memory controller is configured to be not more than 1 terabyte (TB) (i.e., address can be expressed by 40 bits of [39:0]). A size of the cache line of the directory cache 13 is the same as that of the cache line of the memory 10. Besides, a set-associative method is adopted in the directory cache 13 and bits [16:7] of the address are used as an index which is index information of the directory cache 13. It should be noted that the configuration of the directory cache 13 according to the embodiment is only an example and the invention is not limited thereto.

The memory controller 14 controls a data transfer between the cache memory 11 and the memory 10 and is provided with a state managing unit 100 and a data transferring unit 110. The state managing unit 100 updates the directory information on the directory cache 13 based on various requests to be obtained from the processor 12. The data transferring unit 110 performs a data transfer between the cache memory 11 and the memory 10 based on the information (address information, state, and directory information) managed by the directory cache 13.

The intra-node switch 15 is a kind of data transferring device that transfers data and requests between the memory 10 and the processor 12 based on an instruction of the memory controller 14. In addition, the system boards 1a and 1b are connected alternately by an inter-node switch 17 in the embodiment. Thus, each processor 12 is allowed to access the memory 10 provided in another system board 1. Besides, I/O devices 16a and 16b such as a magnetic disk device (HDD), a network card, and a mouse and a keyset are connected to the system boards 1a and 1b, respectively.

Figure 4:
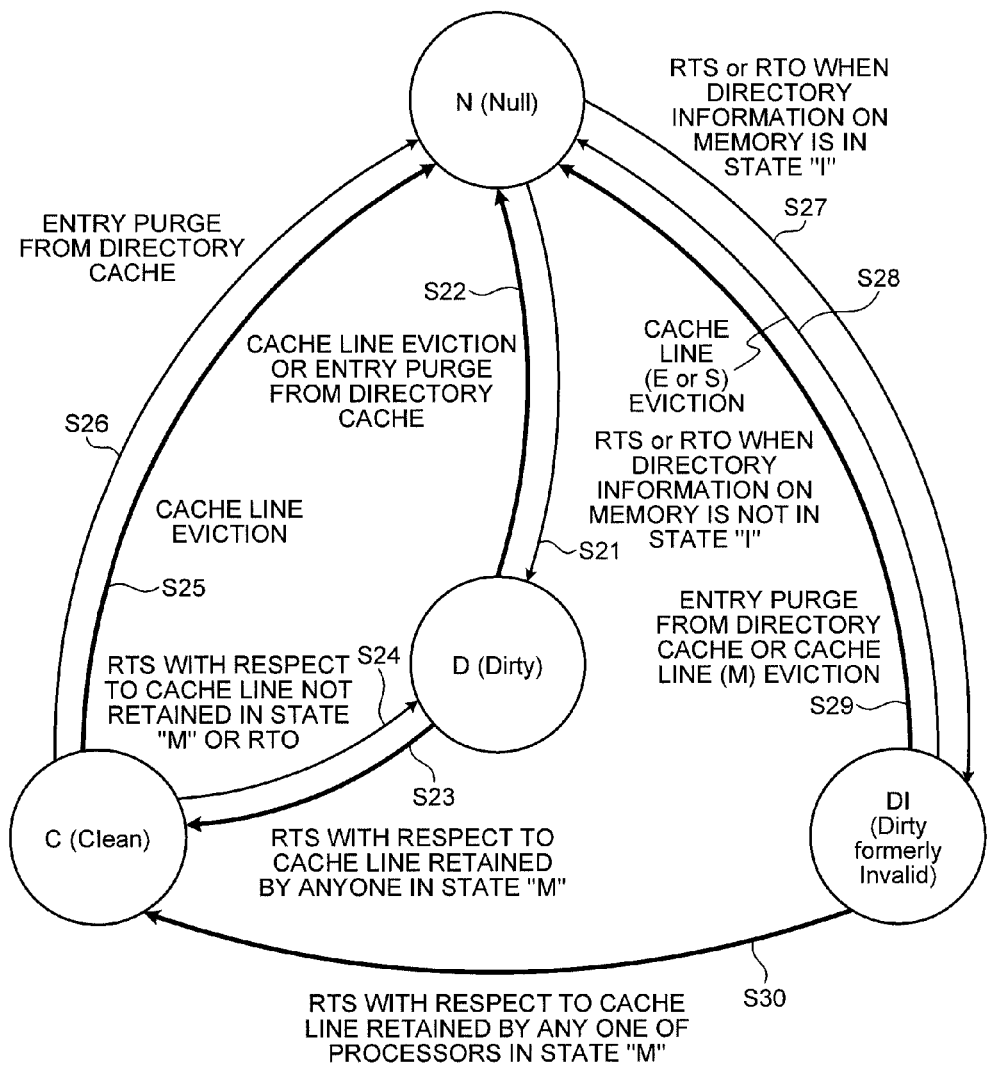
FIG. 4 is an explanatory view of an example of a state transition of an entry of a directory cache.

Next, a state transition of an entry of the directory cache 13 in the multiprocessor system S according to the embodiment will be explained with reference to the drawing. FIG. 4 is an explanatory view of an example of a state transition of an entry of the directory cache 13. The state of an entry of the directory cache 13 is updated by the state managing unit 100 provided in the memory controller 14.

The multiprocessor system S according to the embodiment includes state transitions in response to processes at steps S27 to S30 in addition to state transitions in the conventional multiprocessor system (state transitions in response to processes at steps S21 to S26). Specifically, in a case of receiving the "RTS" or the "RTO" from the processor 12 when the directory information on the memory 10 is not in the state "I" under the entry state "N", the state managing unit 100 changes the state of the entry to "D" (step S21) as illustrated in FIG. 4. In a case of receiving the notification "Eviction" of a cache line of the corresponding entry from the processor 12 or in a case where the entry is purged from the directory cache 13 under the entry state "D", the state managing unit 100 changes the state of the entry to "N" (step S22).

In a case of receiving the "RTS" with respect to a cache line retained in the state "M" by any one of the processors 12 under the entry state "D", the state managing unit 100 changes the state of the entry to "C" (step S23). Besides, in a case of receiving the "RTO" from the processor 12 or in a case of receiving the "RTS" with respect to a cache line which is not retained in the state "M" under the entry state "C", the state managing unit 100 changes the state of the entry to "D" (step S24).

In a case of receiving the notification "Eviction" of a cache line from the processor 12 or in a case where the entry is purged from the directory cache 13 under the entry state "C", the state managing unit 100 changes the state of the entry to "N" (step S25 or step S26).

In contrast, in a case of receiving the "RTS" or the "RTO" from the processor 12 when the directory information on the memory 10 is in the state "I" under the entry state "N", the state managing unit 100 changes the state of the entry to "DI" (step S27). In a case of receiving the notification "Eviction" of a cache line of the corresponding entry from the processor 12 or in a case where the entry is purged from the directory cache 13 under the entry state "DI", the state managing unit 100 changes the state of the entry to "N" (step S28 or step S29). Here, in a case of receiving the notification "Eviction" of a cache line in the sate "M", the data transferring unit 110 accesses the memory 10 to write-back the data on the memory 10.

In a case of receiving the "RTS" with respect to a cache line retained in the state "M" by any one of the processors 12 under the entry state "DI", the state managing unit 100 changes the state of the entry to "C" (step S30).

As described so far, it becomes possible to discriminate whether or not the directory information on the memory 10 is in the state "I" by newly adding the state "DI" as a state of the entry of the directory cache 13 in the multiprocessor system S according to the embodiment.

Figure 5:
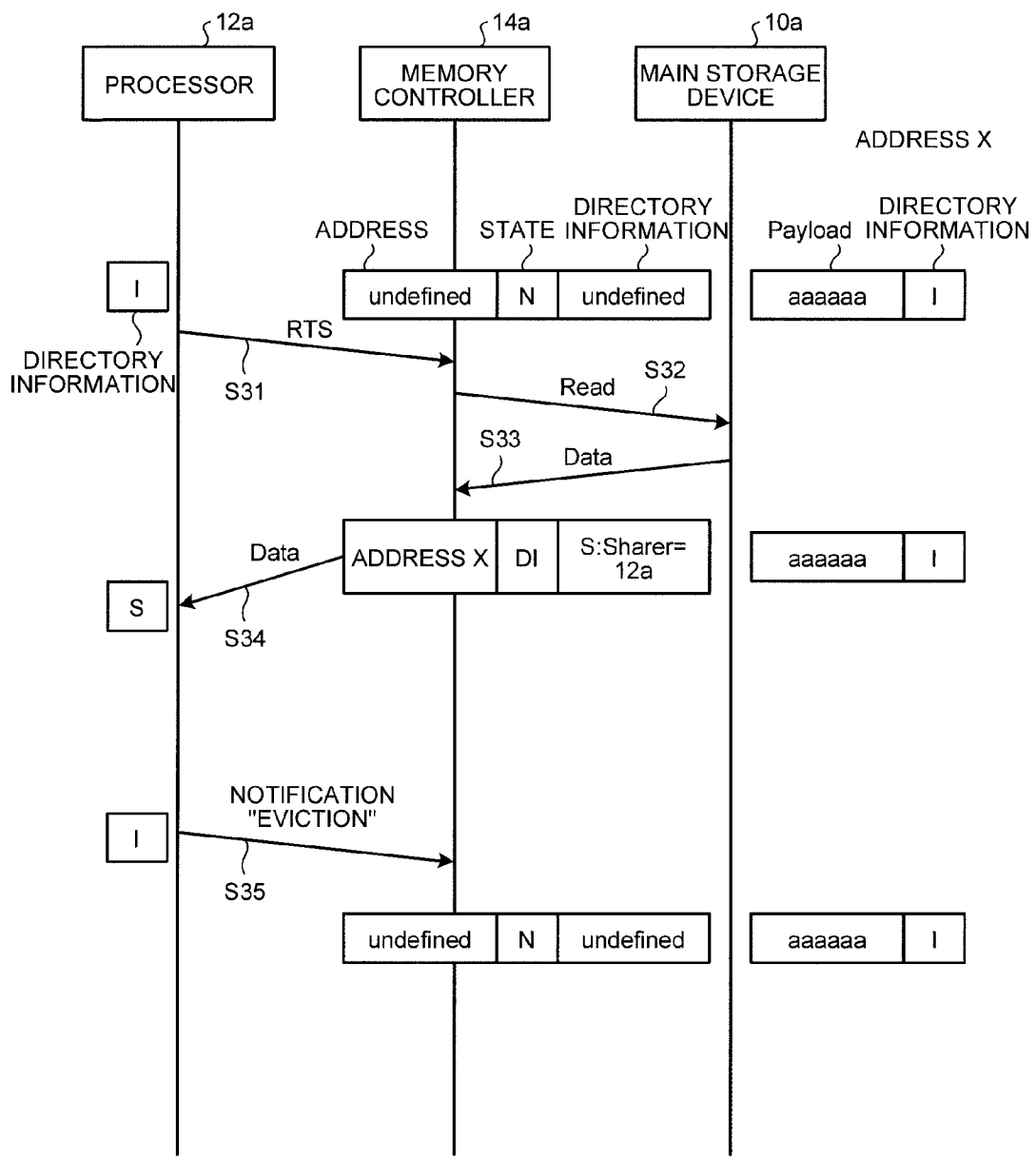
FIG. 5 is an explanatory view of an example of a memory access controlling method in the multiprocessor system according to the embodiment.
Figure 6:
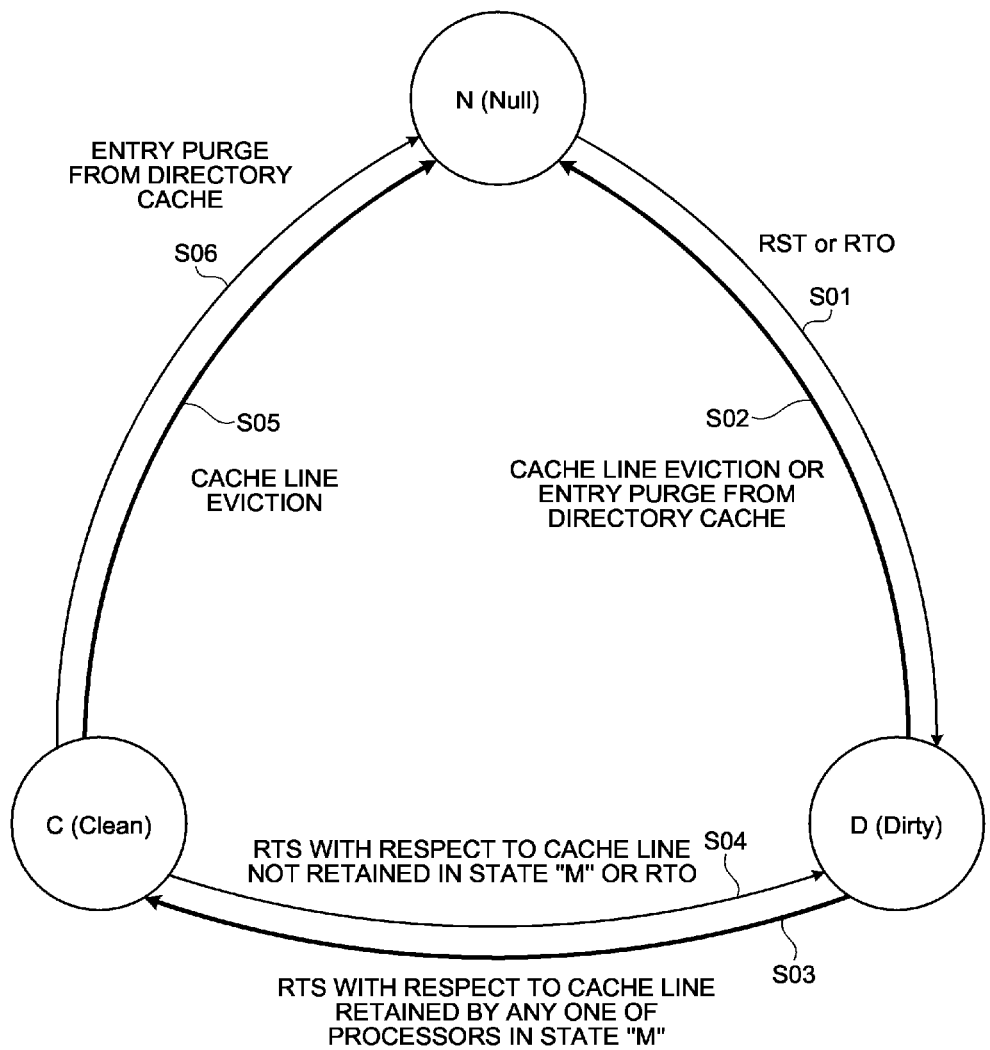
FIG. 6 is an explanatory view of an example of a state transition of an entry of a conventional directory cache.
Figure 7:
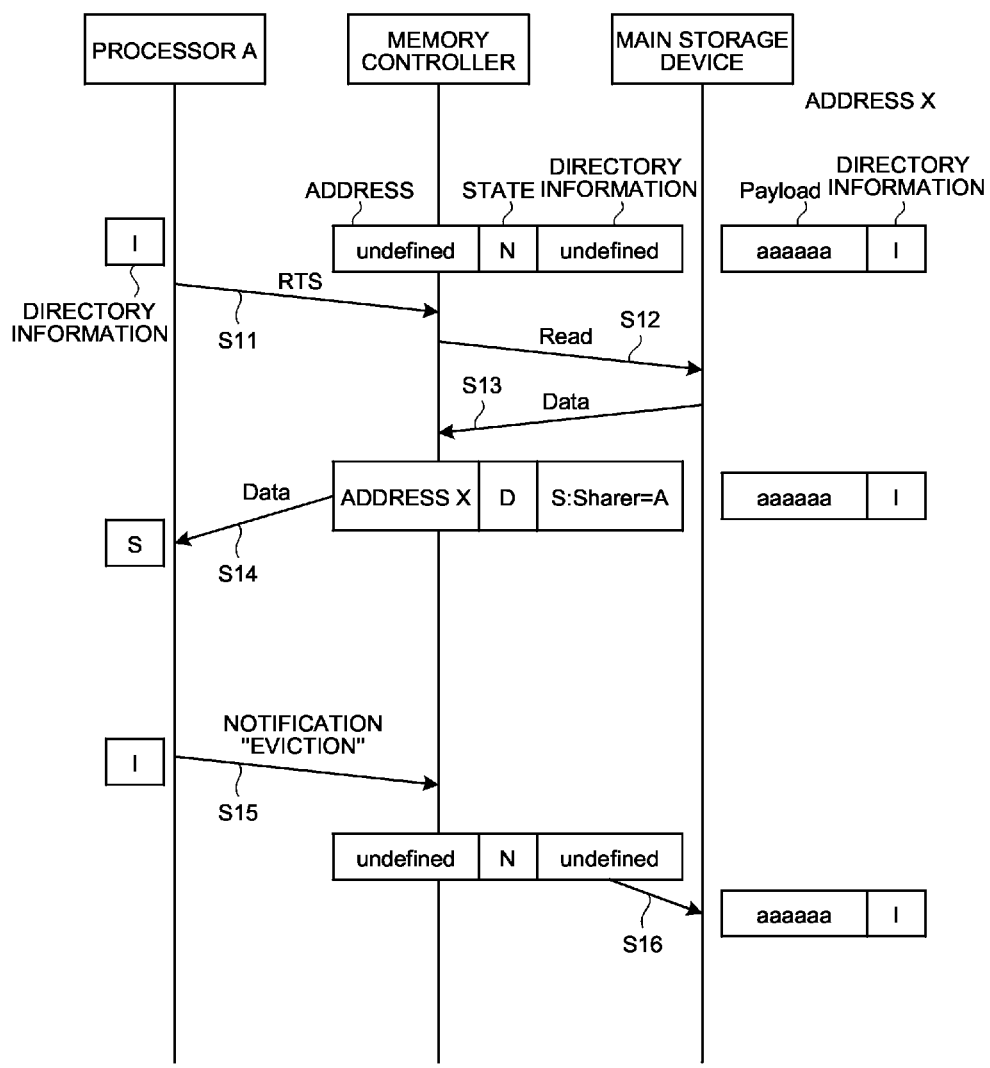
FIG. 7 is an explanatory view of a memory access controlling method in the conventional multiprocessor system.

Next, a memory access controlling method in the multiprocessor system S according to the embodiment will be explained. FIG. 5 is an explanatory view of an example of a memory access controlling method in the multiprocessor system according to the embodiment. Here, data (Payload) "aaaaaa" stored at the address X of the main storage device at an initial state is assumed not to be stored in any cache memory and to be retained in the main storage device in the state "I".

As illustrated in FIG. 5, when the processor 12a transmits the "RTS" to the memory controller 14a to share the data "aaaaaa" stored in the memory 10a (step S31), the data transferring unit 110a requests "Read" with respect to the memory 10a (step S32) and obtains the data "aaaaaa" (step S33). Then, the data transferring unit 110a transmits the obtained data "aaaaaa" to the processor 12a (step S34) and the processor 12a having obtained the data updates the directory information of own cache memory 11a to be "S". Here, the data "aaaaaa" of the main storage device remains in the state "I" since no rewriting of the directory information on the memory 10 occurs at this moment.

On this occasion, the state managing unit 100a records "S:Sharer=12a" as information of the state of the data "aaaaaa" and the processor 12 retaining the data, and records "address X" as address information at the same time in the directory information of the directory cache 13a.

The state managing unit 100a then makes the state of the entry corresponding to the data "aaaaaa" "DI" since the directory information on the directory cache 13a and the directory information on the memory 10 are different and the directory information on the memory 10 is in the state "I:undefined".

To explain more specifically, the state managing unit 100a refers to the directory information on the memory 10a and determines whether or not the directory information is in the state "I" in accessing the memory 10a at step S32. In a case of determining that the directory information on the memory 10a is in the state "I" when the directory information on the directory cache 13a is in the state "N" from the beginning, the state managing unit 100a makes the state of the entry corresponding to the data "aaaaaa" "DI". In a case where the directory information on the memory 10a is not in the state "I" when the directory information on the directory cache 13a is in the state "N" from the beginning, the state managing unit 100a makes the state "D".

Next, in a case of purging a cache line because the cache line cannot be stored in the cache memory 11a, becomes unnecessary, and the like, the processor 12a transmits the notification "Eviction" to the memory controller 14a (step S35).

Here, the state managing unit 100a, in receiving the notification "Eviction", determines whether or not the cached copy is modified and whether or not the state of the entry is "DI". Then, when the cached copy is not modified and the state of the entry is "DI", the state managing unit 100a makes the directory information on the directory cache 13a null (makes the state transit to the state "N") without accessing (performing reading, modifying, and writing in) the memory 10. Here, since the notification "Eviction" includes information of whether or not the cached copy is modified, the memory controller can determine, by referring to the content of the received notification "Eviction", a necessity of accessing the memory.

As described so far, the multiprocessor system S according to the embodiment allows, by additionally providing the state "DI" as a state of an entry of the directory cache 13, reducing an unnecessary memory access which occurs in the conventional multiprocessor system S.

Here, an appropriate supposition will be provided to explain to what degree an access to the memory 10 can be reduced by a memory access controlling method in the multiprocessor system S according to the embodiment. First, the directory cache 13 is supposed to have an adequate capacity and all requests to a cache line which is in a state other than the state "I" are supposed to hit in the directory cache 13.

In a general business application (software), a memory access instruction is executed typically at a ratio of one memory write instruction with respect to two memory read-out instructions. This allows assuming that a computing expressed by "A←f(A,B)" is continuously performed. In other words, an operation of reading areas A and B on the memory 10 and of writing-back a result of the computing in the area A on the memory 10. Viewing this operation from the standpoint of the memory 10, the operation is such that the "RTO" with respect to the area A occurs after the "RTS" with respect to each of the areas A and B (the process of the "RTO" does not involve a memory access and simply causes the directory information to be changed from "S" to "E"). This means that a half (the area A) of the cached copy retained in the cache memory 11 of the processor 12 via the memory read operation needs to be written-back to the memory 10 since the content of the cached copy is updated and the content in the rest half (the area B) is not updated (the rest half can be purged from the cache memory 11 without being written-back).

So far, all necessary areas are assumed to be read from the memory 10 at the time when the CPU executes an instruction. However, the cache line which is copied in the cache memory 11 and used by the processor 12 is often used again actually, before being purged from the cache memory 11, for another purpose. The data read out as "B" through "A←f(A,B)" described above, while being retained in the cache memory 11 of the processor 12, is processed in a form of "B←f(B,C)" and the content of the data is often rewritten.

Taking this fact into consideration, 75% of the cache line read out by the processor 12 from the memory 10 is assumed to be modified before being purged from the cache memory 11 and the rest 25% is assumed to be purged without being modified in the content. Then, a ratio of requests, "Read" ("RTS" or "RTO") which involves a memory access:"Write-back":"Eviction", issued from the processor 12 to the memory controller 14 becomes 4:3:1.

Besides, the number of accesses to the memory 10 occurring at the side of the memory controller 14 with respect to each request from the processor 12 is one time of reading of the memory 10 with respect to one request "Read" which involves a memory access, and one time of writing of the memory 10 with respect to one request "Write-back". With respect to the notification "Eviction", while the number of accesses to the memory 10 in a case of not applying the memory access controlling method according to the embodiment is one time of reading of the memory 10 and one time of writing of the memory 10, no access to the memory 10 occurs in a case of applying the memory access controlling method according to the embodiment.

In other words, in the case of not applying the memory access controlling method according to the embodiment, a memory access needs to be performed nine times based on "4×1+3×1+1×2=9", wherein the numeral "4" is the number of processes for the request "Read", the numeral "3" is the number for the "Write-back", and the numeral "1" is the number for the "Eviction". However, in the case of applying the memory access controlling method according to the embodiment, a memory access needs to be performed only seven times based on "4×1+3×1=7", wherein the numeral "4" is the number of processes for the request "Read" and the numeral "3" is the number for the "Write-back". Therefore, compared to the conventional memory access controlling method, there is an advantage in the memory access controlling method of the multiprocessor system S according to the embodiment in that a memory band to be used is reduced by about 22%.

As described above, by providing the state "DI" as one piece of information which indicates a state of coherence between the directory information on the directory cache 13 and the directory information on the memory 10 in the embodiment, an unnecessary memory access which occurs in the conventional technique can be reduced and thereby a burden on a memory band can be prevented.

Though some embodiments of the present invention have been described in detail so far with reference to the drawings, it should be noted that the embodiment is exemplary and the present invention may be realized in any forms, including the illustrative embodiment, to which various modifications and improvements are made based on the knowledge of those skilled in the art.

For example, while the request transmitted from the processor 12 to the memory controller 14 is configured to be "RTS" in the embodiment, the invention is not limited thereto and the "RTO" may be substituted. Besides, while the "RTS" and the "RTO" are described in the embodiment since the two can be cited as a general request for "Read", the invention is not limited thereto. The state "DI" may be utilized when the directory information on the memory 10 is in the state "I" and the directory information on the directory cache 13 is in a state other than the state "I" with respect to another request "Read" of different kind and also a request "BlockStore" which does not involve "Read".

Besides, while the processor 12 is configured in the description as a source of requests in the embodiment, the source of requests may not be limited to the processor 12 and may be the I/O device 16. The processor 12 and the I/O device 16 are considered as being in the same kind in the light of an agent that issues a request "Read/Write".

In addition, while the system in which directory information is present in the memory 10 is applied in the embodiment, the directory information may be provided in a location other than the memory 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a main storage device that stores data and manages a state of the stored data as directory information;
cache memories that retain a copy of the data stored in the main storage device;
processors that perform a process by using the data retained in the cache memories;
a directory cache that manages the directory information of the data stored in the main storage device separately from the main storage device, and manages coherence state information indicating a state of coherence between the directory information managed by the directory cache and the directory information managed by the main storage device; and
a memory control apparatus that controls a data transfer between the cache memories and the main storage device based on the information managed by the directory cache,
wherein when a single cache memory retains a copy of data stored in the main storage device and the memory control apparatus receives a notice that data retained in the cache memory is purged from any of the processors, the memory control apparatus updates the directory information on the directory cache and accesses the main storage device to perform a write-back of the directory information on the main storage device when the coherence state information indicates that the directory information on the directory cache and the directory information on the main storage device are different, and updates the directory information on the directory cache without accessing the main storage device when the data on the cache memory is not modified by the processor, the coherence state information indicates that the directory information on the directory cache and the directory information on the main storage device are different, and the directory information on the main storage device indicates that the copy of the data is not retained by any of the processors, and
the memory control apparatus performs a data transfer between the cache memory and the main storage device based on address information, state information, and directory information managed by the directory cache and accesses the main storage device to write-back the data on the main storage device in a case of receiving notification "Eviction" of a cache line in the state "Modify (M)", wherein
the directory cache includes, as the coherence state information, a state "Dirty formerly Invalid (DI)" and
the state "Dirty formerly Invalid (DI)" is a state that is newly added as one piece of information which indicates a state of coherence between the directory information on the directory cache and the directory information on the cache memory and that indicates a state telling the directory information on the directory cache is different from the directory information on the cache memory and the directory information on the cache memory is in a state "Invalidate (I)", wherein
the notification "Eviction" is a signal to be transmitted to the memory control apparatus from the processor when the processor purges data in the cache memory in a case of purging the cache line because the cache line cannot be stored in the cache memory or becomes unnecessary, and includes information of whether or not the cached copy is modified and
the memory control apparatus further includes a state managing unit that determines, in receiving the notification "Eviction", a necessity of accessing the cache memory by referring to content of the received notification "Eviction", determines whether or not the cached copy is modified and whether or not the state of an entry is "(Dirty formerly Invalid) DI", when the cached copy is not modified and the state of the entry is "(Dirty formerly Invalid) DI", and makes the directory information on the directory cache null without performing reading, modifying, and writing in the cache memory, wherein
the state managing unit makes a state of an entry corresponding to data stored at an address X of the main storage device at an initial state "D" in a case where the directory information on the memory is not in the state "I" when the directory information on the directory cache is in the state "N" from the beginning.

2. The information processing apparatus according to claim 1, wherein
the directory cache includes, as the coherence state information, a state "Dirty formerly Invalid (DI)" that indicates a state where the directory information on the directory cache and the directory information on the main storage device are different and the directory information on the main storage device indicates that the copy of the data is not retained by any of the cache memories, and
the memory control apparatus updates the directory information on the directory cache without accessing the main storage device when the data is not modified by the processor and the coherence state information is in "Dirty formerly Invalid (DI)" state in a case where the memory control apparatus receives a notification from the processor that the data retained in the cache memory is purged from the processor.

3. The information processing apparatus according to claim 2, wherein the memory control apparatus changes the state of coherence from a state "Null (N)" to the state "Dirty formerly Invalid (DI)" when the directory information on the main storage device indicates that the copy of the data is not retained by any of the processors, in a case where the memory control apparatus receives a request from the processor under a condition where the coherence state information is in "Null (N)" state which is a state where valid directory information is not present on the directory cache.

4. The information processing apparatus according to claim 1, wherein
the memory control apparatus updates the directory information on the directory cache based on a request to be obtained from the processor and changes the state of an entry to "Null (N)" in a case of receiving the notification "Eviction" of the cache line of the corresponding entry from the processor or in a case where the entry is purged from the directory cache, when the entry state is "Dirty formerly Invalid (DI)".

5. The information processing apparatus according to claim 1, wherein
information indicating a state of coherence between the directory information managed by the directory cache and the directory information managed by the cache memory is indicated by four states "(Null) N", "(Clean) C", "(Dirty) D", and "(Dirty formerly Invalid) DI".

6. The information processing apparatus according to claim 1, wherein
the memory control apparatus further includes a state managing unit that changes, in a case of receiving a "(Request To Share) RTS" with respect to a cache line retained in the state "Modify (M)" by any one of the processors under an entry state "(Dirty) D", a state of an entry to "(Clean) C" and changes, in a case of receiving a "(Request To Own) RTO" from the processor or in a case of receiving the "(Request To Share) RTS" with respect to the cache line which is not retained in the state "Modify (M)" under the entry state "(Clean) C", the state of the entry to "(Dirty) D", wherein
the state managing unit makes a state of an entry corresponding to data stored at an address X of the main storage device at an initial state "D" in a case where the directory information on the memory is not in the state "I" when the directory information on the directory cache is in the state "N" from the beginning.

7. The information processing apparatus according to claim 1, wherein
data stored at an address X of the main storage device at an initial state is not stored in any cache memory and is retained in the main storage device in the state "I".

8. A memory control apparatus provided in an information processing apparatus including a main storage device that stores data and manages a state of the data as directory information, a plurality of cache memories that retain a copy of the data stored in the main storage device, a plurality of processors that perform a process by using the data retained in the cache memories, and a directory cache that manages the directory information of the data stored in the main storage device separately from the main storage device and manages information indicating a state of coherence between the self-managing directory information and the directory information managed by the main storage device, the memory control apparatus comprising:
a transfer controller that controls a data transfer between the cache memories and the main storage device based on the information managed by the directory cache;
an information updater that updates the directory information on the directory cache and accesses the main storage device to perform a write-back of the directory information on the main storage device when the directory information on the directory cache and the directory information on the main storage device is determined to be different in the state of coherence, and updates the directory information on the directory cache without accessing the main storage device when the data is not modified by the processor, and the directory information on the directory cache and the directory information on the main storage device is determined to be different and the directory information on the main storage device is determined to be in a state indicating that the copy of the data is not retained by any of the processors in the state of coherence when the memory control apparatus receives a notification to an effect that the data retained in the cache memory is purged from the processor under a condition where a number of cache memories retaining the copy of the data stored in the main storage device is one; and
a data transferring unit that performs a data transfer between the cache memory and the main storage device based on address information, state information, and directory information managed by the directory cache and accesses the main storage device to write-back the data on the main storage device in a case of receiving notification "Eviction" of a cache line in the state "Modify (M)", wherein
the directory cache includes, as the coherence state information, a state "Dirty formerly Invalid (DI)" and
the state "Dirty formerly Invalid (DI)" is a state that is newly added as one piece of information which indicates a state of coherence between the directory information on the directory cache and the directory information on the cache memory and that indicates a state telling the directory information on the directory cache is different from the directory information on the cache memory and the directory information on the cache memory is in a state "Invalidate (I)", wherein
the notification "Eviction" is a signal to be transmitted to the memory control apparatus from the processor when the processor purges data in the cache memory in a case of purging the cache line because the cache line cannot be stored in the cache memory or becomes unnecessary, and includes information of whether or not the cached copy is modified and
the memory control apparatus further includes a state managing unit that determines, in receiving the notification "Eviction", a necessity of accessing the cache memory by referring to content of the received notification "Eviction", determines whether or not the cached copy is modified and whether or not the state of an entry is "(Dirty formerly Invalid) DI", when the cached copy is not modified and the state of the entry is "(Dirty formerly Invalid) DI", and makes the directory information on the directory cache null without performing reading, modifying, and writing in the cache memory, wherein
the state managing unit makes a state of an entry corresponding to data stored at an address X of the main storage device at an initial state "D" in a case where the directory information on the memory is not in the state "I" when the directory information on the directory cache is in the state "N" from the beginning.

9. The memory control apparatus according to claim 8, wherein
the directory cache manages information which indicates the state of coherence between the self-managing directory information and the directory information managed by the main storage device and includes, as one piece of information indicating the state of coherence, a state "Dirty formerly Invalid (DI)" that allows discriminating a state where the directory information on the directory cache and the directory information on the main storage device is different, and the directory information on the main storage device indicates that the copy of the data is not retained by any of the cache memories, and the memory control apparatus updates the directory information on the directory cache without accessing the main storage device when the data is not modified by the processor and the state of coherence between the directory information on the directory cache and the directory information on the main storage device is determined to be "DI" when the memory control apparatus receives the notification to the effect that the data retained in the cache memory is purged from the processor.

10. The memory control apparatus according to claim 9, wherein the memory control apparatus changes the state of coherence from the state "Null (N)" to the state "Dirty formerly Invalid (DI)" when the directory information on the main storage device is determined to be in the state indicating that the copy of the data is not retained by any of the processors when the memory control apparatus receives a predetermined request from the processor under a condition where the state of coherence between the directory information on the directory cache and the directory information on the main storage device is "Null (N)" which indicates that valid directory information is not present on the directory cache.

11. The memory control apparatus according to claim 8, wherein the memory control apparatus performs a memory access control based on "MESI" (Modify/Exclusive/Share/Invalid) protocol.

* * * * *